United States Patent
Williams

(10) Patent No.: US 10,295,067 B2
(45) Date of Patent: May 21, 2019

(54) RETAINER FOR CHECK VALVE

(71) Applicant: Kohler Co., Kohler, WI (US)

(72) Inventor: Steven D. Williams, Plymouth, WI (US)

(73) Assignee: KOHLER CO., Kohler, WI (US)

(*) Notice: Subject to any disclaimer, the term of this patent is extended or adjusted under 35 U.S.C. 154(b) by 1 day.

(21) Appl. No.: 15/236,048

(22) Filed: Aug. 12, 2016

(65) Prior Publication Data

US 2017/0051835 A1  Feb. 23, 2017

Related U.S. Application Data

(60) Provisional application No. 62/207,141, filed on Aug. 19, 2015.

(51) Int. Cl.
*F16B 21/04* (2006.01)
*F16K 5/08* (2006.01)
(Continued)

(52) U.S. Cl.
CPC ............... *F16K 5/08* (2013.01); *F16B 21/04* (2013.01); *F16K 27/0209* (2013.01);
(Continued)

(58) Field of Classification Search
CPC ................. F16B 21/04; F16K 27/0209; Y10T 137/7668; F16L 37/08; F16L 37/113;
(Continued)

(56) References Cited

U.S. PATENT DOCUMENTS 2,898,135 A  8/1959  Wurzel
3,347,266 A  10/1967  Hansen
(Continued)

FOREIGN PATENT DOCUMENTS

CN        101932862        12/2010
DE  10 2011 087 687 A1  6/2013
(Continued)

OTHER PUBLICATIONS

JP 2002330531; Tsuji; Nov. 15, 2002; Original and Translation.*
Extended European Search Report issued in corresponding application on. 16184121.8 dated Jan. 4, 2017.

*Primary Examiner* — Marina A Tietjen
*Assistant Examiner* — Paul J Gray
(74) *Attorney, Agent, or Firm* — Foley & Lardner LLP

(57) ABSTRACT

A retainer for retaining a check valve to a valve body includes a continuous body, a first group of projections, and a second group of projections. The continuous body is configured to engage a slot of the valve body to secure the continuous body to the valve body. The continuous body is further configured to include an opening configured to receive a portion of the check valve. The first group of projections is configured to extend radially from the continuous body. The first group of projections is further configured to contact the valve body to limit rotation of the retainer relative to the valve body. The second group of projections is configured to extend axially from the continuous body. The second group of projections is further configured to engage at least one of the check valve and the valve body.

20 Claims, 5 Drawing Sheets

(51) Int. Cl.
*F16K 27/02* (2006.01)
*F16K 27/06* (2006.01)
*F16L 37/10* (2006.01)
*F16L 37/08* (2006.01)
*F16L 37/24* (2006.01)

(52) U.S. Cl.
CPC .............. *F16K 27/06* (2013.01); *F16L 37/08* (2013.01); *F16L 37/101* (2013.01); *F16L 37/24* (2013.01)

(58) Field of Classification Search
CPC ....... F16L 37/24; F16L 37/252; F16L 37/121; F16L 37/103; F16L 37/101
USPC ....... 285/305, 307, 314, 321, 361, 401, 360, 285/362; 137/454.6, 315.33, 540.11
See application file for complete search history.

(56) References Cited

U.S. PATENT DOCUMENTS

| | | |
|---|---|---|
| 3,401,436 A | 9/1968 | Bradshaw |
| 4,284,097 A | 8/1981 | Becker et al. |
| 4,667,697 A | 5/1987 | Crawford |
| 4,832,378 A | 5/1989 | Zepp |
| 5,181,535 A | 1/1993 | Scaramucci |
| 5,295,506 A * | 3/1994 | Smith ................... E03C 1/104 137/271 |
| 5,350,203 A | 9/1994 | McNaughton et al. |
| 5,607,192 A | 3/1997 | Lee |
| 5,660,493 A | 8/1997 | Stephens |
| 5,711,482 A | 1/1998 | Yu |
| 5,826,920 A | 10/1998 | Bartholomew |
| 6,123,094 A | 9/2000 | Breda |
| 6,810,664 B1 | 11/2004 | Lorenc |
| 6,932,391 B2 | 8/2005 | Lebreton et al. |
| 2004/0089349 A1 | 5/2004 | Meyer |
| 2012/0125453 A1* | 5/2012 | Murray ................. F16K 15/038 137/511 |
| 2014/0261751 A1 | 9/2014 | Brouwer et al. |
| 2014/0261779 A1 | 9/2014 | Niver |
| 2014/0261808 A1 | 9/2014 | Brouwer et al. |
| 2014/0261813 A1 | 9/2014 | Brouwer et al. |

FOREIGN PATENT DOCUMENTS

| | | |
|---|---|---|
| EP | 0 445 020 A1 | 9/1991 |
| JP | 2002-330531 A | 11/2002 |
| WO | WO-93/15326 A1 | 8/1993 |
| WO | WO9937137 | 7/1999 |

* cited by examiner

RETAINER FOR CHECK VALVE

CROSS-REFERENCE TO RELATED PATENT APPLICATION

This application claims the benefit of U.S. Provisional Patent Application No. 62/207,141, filed Aug. 19, 2015, which is incorporated herein by reference in its entirety.

TECHNICAL FIELD

The present application relates generally to a retainer and a system for retaining a check valve in a valve body for use in a plumbing fixture. More particularly, the present application relates to a retainer having tangs, a first group of projections, a second group of projections, a continuous body and a hole.

BACKGROUND

Machines, tools and numerous other types of structures and equipment often include movable components which are to be secured in place. To achieve this goal, use is sometimes made of retainers which are mounted on one component to form an artificial shoulder lying in the path of the other component, i.e., the retained part. Retainers are used in a variety of applications with grooved parts that are relatively movable axially of each other in order to limit or restrain the extent of such relative axial movement. In using a conventional design of a retainer, retaining ring, or snap ring, it is necessary for an operator to use tools to open the retainer. In some applications, retainers contain small recesses or holes in each side of the retainer body within which an operator can insert a special tool to open the retainer. Requiring the use of tools for the installation or removal of retainers is cumbersome and inefficient.

A typical retainer is circular and includes the retainer body and end sections which are flat and coplanar with the retainer body. The end sections may include recesses, holes, pins, or other suitable means for manipulation through the use of a tool. Typical retainers are not built directly into assemblies and rather are installed by operators on an as-needed basis. In addition, typical retainers do not have a mechanism for maintaining a rotational position once installed in an application. For instance, once in place a retainer may rotate, potentially leading to detachment of the retainer from the application.

In application, retainers are commonly used in plumbing fixtures; specifically, within valve assemblies. A valve assembly may include a valve body, a check body, and a retainer. Valve assemblies are used in a variety of plumbing fixtures for controlling the temperature and volume of water dispensed from the fixture. A valve assembly may receive hot water and cold water from separate supply lines and controllably mix the water to provide an output having an intermediate temperature. Installation of a valve assembly typically requires temporarily discontinuing the water pressure in the supply lines which connect to the valve assembly. This procedure often requires the removal of a number of retainers. Each time the valve assembly is changed, upgraded, or swapped for a different valve assembly; it may be necessary to installer or remove the retainers within the valve assembly. A retainer may also be used to retain a check valve within a valve body. Check valves, which are also known as service, stop, or stop-check valves, have been used in valve bodies to control the flow of fluid (e.g., water) through the valve body. Typically, check valves can be configured in an open position, in which the fluid flows unrestricted through the valve body, and a closed position, in which the fluid is prohibited from flowing through the valve body. For example, the check valve may be rotated relative to the valve body between the open and closed positions. Further, a valve body may include a recess for receiving the check valve.

A need exists for a retainer that can be installed and removed without the required use of tools by the operator. In addition, a need exists for a retainer that includes a securing mechanism for maintaining the rotational position of the retainer once installed. This retainer would allow for operators to install and remove the retainer without tools; resulting in more efficient and ergonomic installation and removal of the retainer. In a plumbing fixture, this retainer could be used in combination with a check valve and a valve body to maintain the position of the check valve within the valve body.

SUMMARY

One implementation of the present disclosure is a retainer for retaining a check valve (e.g., service, stop, or stop-check valves, etc.) within a valve body. The retainer may include a continuous body configured to engage a channel (e.g., groove, pathway, recess, etc.) of the valve body to secure the continuous body to the valve body. The continuous body may include an opening (e.g., hole, etc.) configured to receive a portion of the check valve. The retainer may also include a first group of projections (e.g., locking jaw, locking edge, lock, step, protrusion, etc.) extending radially from the continuous body and configured to contact the valve body to limit rotation of the retainer relative to the valve body. The retainer may also include a second group of projections (e.g., dimple, protuberance, protrusion, detent, etc.) extending axially from the continuous body and configured to engage at least one of the check valve and valve body.

In some embodiments, the retainer may be rotatable relative to the valve body to selectively engage the continuous body with the channel. In some embodiments, the retainer may be rotatable relative to the check valve to secure the continuous body to the check valve. In some embodiments, the continuous body may have an annular shape. In some embodiments, the continuous body may also be substantially flat.

Another implementation of the present disclosure is a valve assembly for a plumbing fixture. The valve assembly may include a valve body including a first portion and a second portion which define a cavity therebetween. The valve body may have a wall of the first portion define at least a portion of the cavity and include a channel. The valve assembly may include a check valve disposed in the cavity. The check valve may be configured to selectively stop the flow of fluid through the valve assembly. The valve assembly may include a retainer. The retainer may include a continuous body that selectively engages the channel upon a first rotation of the retainer relative to the valve body which couples the retainer to the valve body. The retainer may include a first group of projections extending radially from the continuous body of the retainer. The first group of projections may be configured to contact a stop of the valve body upon a second rotation of the retainer relative to the valve body. The retainer may include a second group of projections extending axially from the continuous body of the retainer. The second group of projections may be configured to engage at least one of the check valves and the second portion of the valve body.

In some embodiments, the first group of projections may be configured such that when it contacts a stop, further rotation of the retainer in the direction towards the stop is prohibited by the stop. The second rotation of the retainer may occur over a greater distance than the first rotation. In some embodiments, the second group of projections may engage an opening in the second portion of the valve body. In some embodiments, the continuous body of the retainer may include an outer edge wherein the outer edge engages the channel and an inner edge of the continuous body of the retainer engages a channel in the check valve. In some embodiments, the continuous body may have an annular shape. In some embodiments, the continuous body may also be substantially flat.

Yet another implementation of the present disclosure is a retainer for retaining a check valve (e.g., service, stop, or stop-check valves, etc.) to a valve body. The retainer may include a continuous body configured to engage a channel (e.g., groove, pathway, recess, etc.) of the valve body to secure the continuous body to the valve body. The continuous body may include an opening (e.g., hole, etc.) configured to receive a portion of the check valve. The retainer may also include a first group of projections (e.g., locking jaw, locking edge, lock, step, protrusion, etc.) extending radially from the continuous body and configured to contact the valve body to limit rotation of the retainer relative to the valve body. The retainer may also include a second group of projections (e.g., dimple, protuberance, protrusion, detent, etc.) extending axially from the continuous body and configured to engage at least one of the check valve and valve body. The retainer may also include a group of tangs extending axially from the continuous body. The group of tangs is configured to exert a force on the second group of projections upon displacement of the tangs.

In some embodiments, the retainer may be rotatable relative to the valve body to selectively engage the continuous body with the channel. In some embodiments, the retainer may be rotatable relative to the check valve to secure the continuous body to the check valve. In some embodiments, the continuous body may have an annular shape. In some embodiments, the continuous body may also be substantially flat. In some embodiments, the first group of projections may be configured such that when it contacts a stop, further rotation of the retainer in the direction towards the stop is prohibited by the stop. In some embodiments, the second rotation of the retainer may occur over a greater distance than the first rotation. In some embodiments, the second group of projections may engage the retainer via a recess in the retainer.

Yet another implementation of the present disclosure is a valve assembly for a plumbing fixture. The valve assembly may include a valve body including a first portion and a second portion which define a cavity therebetween. The valve body may have a wall of the first portion define at least a portion of the cavity and include a channel. The valve assembly may include a check valve disposed in the cavity. The check valve may be configured to selectively stop the flow of fluid through the valve assembly. The valve assembly may include a retainer. The retainer may include a continuous body that selectively engages the channel upon a first rotation of the retainer relative to the valve body which couples the retainer to the valve body. The retainer may include a first group of projections extending radially from the continuous body of the retainer. The first group of projections may be configured to contact a stop of the valve body upon a second rotation of the retainer relative to the valve body. The valve body may include a second group of projections extending axially from the continuous body of the retainer. The second group of projections may be configured to engage at least one of the check valve and the retainer.

In some embodiments, the first group of projections may be configured such that when it contacts a stop, further rotation of the retainer in the direction towards the stop is prohibited by the stop. In some embodiments, the second rotation of the retainer may occur over a greater distance than the first rotation. In some embodiments, the second group of projections may engage the retainer. In some embodiments, the continuous body of the retainer may include an outer edge wherein the outer edge engages the channel and an inner edge of the continuous body of the retainer engages a channel in the check valve. In some embodiments, the continuous body may have an annular shape. In some embodiments, the continuous body may also be substantially flat. In some embodiments, the retainer may be rotatable relative to the valve body to selectively engage the continuous body with the channel.

According to one embodiment, a method of installing the retainer would include at least the following steps: inserting the check valve with the retainer into the valve body; rotate the retainer to seat into the channel within the valve body; rotate the retainer such that the second group of projections seat within the recesses on the valve body causing the retainer to be secured in place; and installing a valve cartridge to block the tangs and disallow retainer removal. According to an exemplary embodiment, the retainer is pre-installed on the check valve such that an operator does not have to install the retainer on the check valve.

BRIEF DESCRIPTION OF THE DRAWINGS

The disclosure will become more fully understood from the following detailed description, taken in conjunction with the accompanying drawings, wherein like reference numerals refer to like elements, in which.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting. As discussed below, the systems and methods can be utilized in a number of devices for various types of applications or systems. For example, the device of the present disclosure may be used in conjunction with a plumbing fixture such as: a faucet, a sprayer, toilets, latrines, urinals, drinking fountains, eye wash stations, emergency showers, showers, shower heads, shower pans, steam showers, saunas, laundry faucets, utility faucets, bath tubs, spas, sinks, water dispensers, as well as many other applications and systems.

Figure 1:
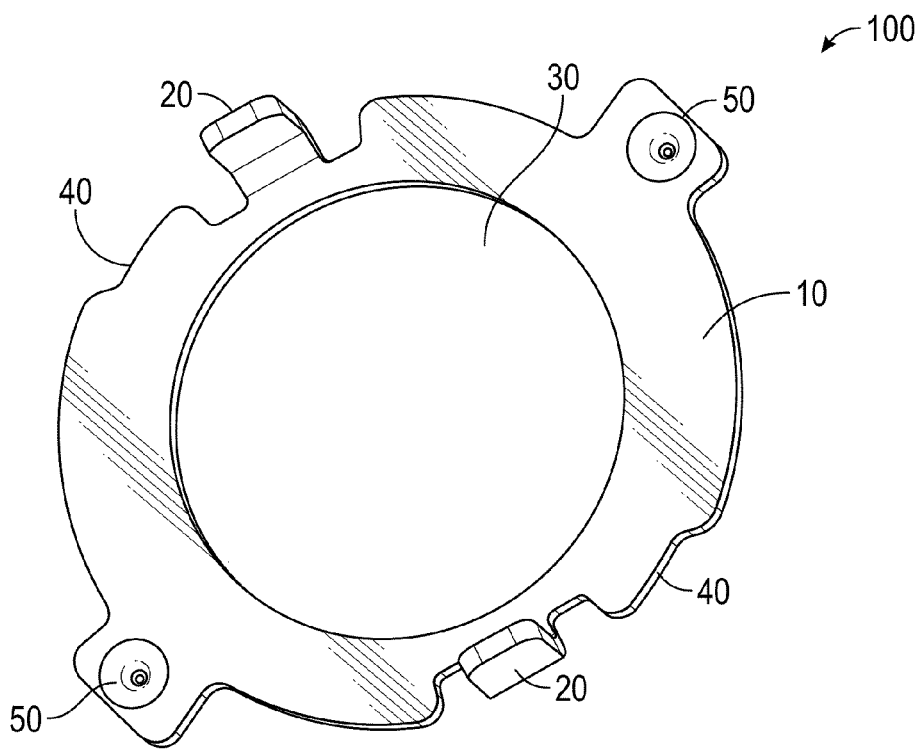
FIG. 1 is a perspective view of a retainer, according to an exemplary embodiment.

Referring to FIG. 1, a perspective view of a retainer 100, according to an exemplary embodiment, is shown. The retainer 100 includes a continuous body 10, tangs 20, an opening 30 for receiving the check valve 110, a first group of projections 40, and a second group of projections 50. Typically, snap rings 200, spiral rings 300, and other retaining rings are not continuous (i.e., they are crescent-shaped). The continuous body 10 of the retainer 100 of the present disclosure has a generally flat toroidal shape, with the exceptions of a number of second projections 50 and a number of tangs 20. In application, the retainer 100 may be constructed from many suitable materials. For instance, the retainer 100 may be constructed of metallic material such as a steel alloy. In other applications, the retainer 100 may be constructed from a plastic material or other polymer blend. Further, the retainer 100 may be made from annealed or oil tempered wire, hot rolled or cold drawn and annealed spring steel strip, or hard drawn wire. The continuous body 10 of the retainer 100 may be constructed to receive any suitable diameter check valve 110 through the opening 30 of the retainer 100. The first group of projections 40 of the retainer 100 serves to lock the continuous body 10 of the retainer 100 to the valve body 120 upon rotation of the retainer 100 within the check valve 110 and valve body 120. One having ordinary skill in the art will appreciate that the number, shape, roundness, and size of the first group of projections 40 shall be determined by their suitability for a given application. In another alternative embodiment, it may be desirable to provide multiple, but less-substantial projections rather than the first group projections 40. The second group of projections 50 of the retainer 100 serves to engage one of the check valve 110 and valve body 120 upon rotation of the retainer 100 within the check valve 110 and the valve body 120. The retainer 100 is in free form—i.e., there are no external forces acting on it. In use, retainer 100 experiences external forces. Therefore, the free form dimensions of the retainer 100 may differ from its loaded dimensions.

Figure 2:
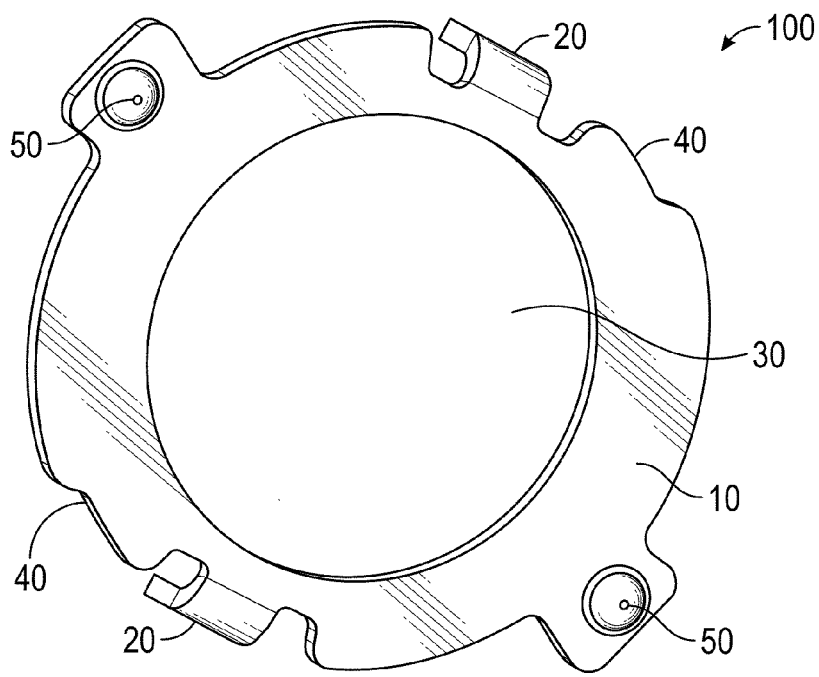
FIG. 2 is another perspective view of a retainer, according to an exemplary embodiment.

Referring to FIG. 2, a perspective view of a retainer 100, according to an exemplary embodiment, is shown. In FIG. 2, the second group of projections 50 can be more easily viewed. In an exemplary embodiment, the second group of projections 50 is shown as rounded with a circular base. Other embodiments may utilize second group of projections 50 that are not necessarily rounded and do not necessarily have a circular base. For instance, a second group of projections 50 that is rounded but has a triangular, square, or oval base may be used. Further, the second group of projections 50 may be non-uniform according to other embodiments. For instance, one example of the second group of projections 50 may take the shape of a non-rounded rectangle, while another may take the shape of a rounded triangle. One having ordinary skill in the art will appreciate that the number, shape, roundness, and size of the second group of projections 50 shall be determined by their suitability for a given application. The tangs 20 may be constructed in any suitable shape, thickness or matter as determined by the application requirements.

Radial displacement of the tangs 20 by the operator, through the application of a force, is intended to result in the radial displacement of the second group of projections 50. When the retainer 100 is installed, radially displacing the tangs 20 will result in the second group of projections 50 unseating from the recesses 70 within the valve body 120. For example, it may be desirable to have a retainer 100 with tangs 20 of a certain size or shape for a particular application. Longer tangs will generally decrease the amount of externally applied forcer needed to release the retainer from the valve body but will also take up additional space. Conversely, it may be desired to have small tangs in order to take up as little space as possible. In an alternative embodiment, it would be possible for the valve body 120 to contain protuberances in place of recesses 70 and for the retainer 100 to contain recesses rather than the second group of projections 50. In this embodiment, the securing mechanism would be preserved.

Figure 3:
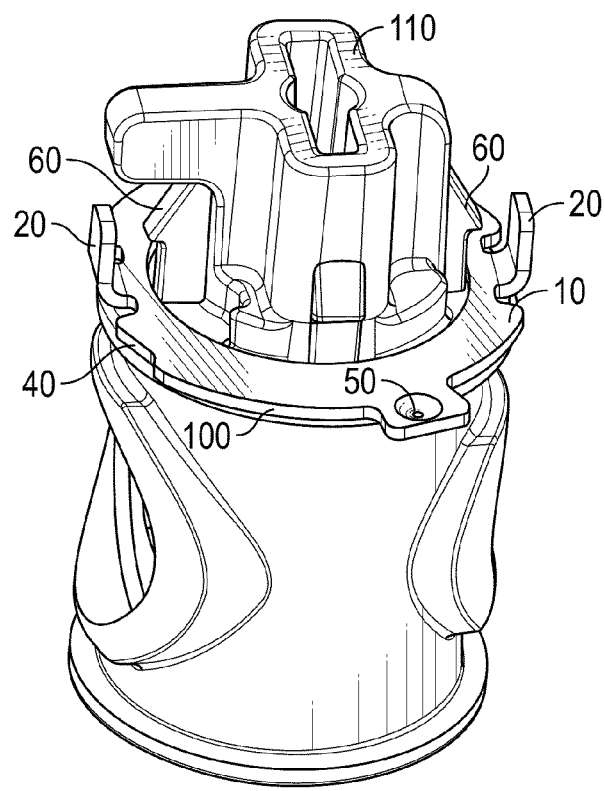
FIG. 3 is a perspective view of a check valve including a retainer, according to an exemplary embodiment.

Referring to FIG. 3, a perspective view of a check valve 110 including a retainer 100, according to an exemplary embodiment, is shown. In FIG. 3, a retainer 100 is shown installed on a check valve 110. The retainer 100 is held axially in place by a retention protrusion 60 of the check valve 110. While held between the retention protrusion 60 and the check valve 110, the retainer 100 is intended to rotate freely as well as translate axially within the physical boundaries of the check valve 110 and the retention protrusion 60. In application, the retention protrusion 60 of the check valve 110 may be replaced by any other suitable retention structure. For instance, other retention structures such as a barb, tang, ear, angle-shaped stop, etc. may be used. In application, the check valve 110 may be purchased by an operator with the retainer 100 installed from the manufacturer. In certain applications, it may not be necessary to utilize a retention protrusion 60 with the present disclosure.

Figure 4:
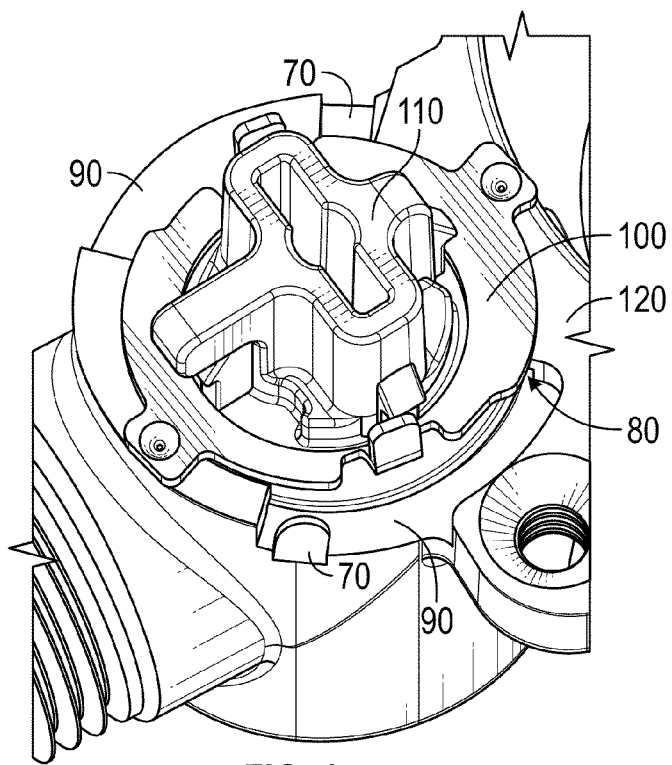
FIG. 4 is a perspective view of a check valve partially installed in a valve body including a retainer, according to an exemplary embodiment.

Referring to FIG. 4, a perspective view of a check valve 110 partially installed in a valve body 120 including a retainer 100, according to an exemplary embodiment, is shown. In FIG. 4, a system for retaining a check valve in a valve body is shown to include a retainer 100 is shown installed on a check valve 110 which is installed within a valve body 120. The valve body 120 includes a number of recesses 70 for receiving the second group of projections 50 of the retainer 100, a channel 90 for receiving the retainer 100, and a slot 80 for receiving the retainer 100 and the first group of projections 40. In some applications, the check valve 110 may also contain a slot 80 for receiving the retainer 100. In these applications, the slot 80 of the check valve 110 may also be configured to lock with the retainer 100, assuming the retainer 100 contained more of the first group of projections 40 on the inside edge of the retainer 100. In an alternative embodiment, the first group of projections 40 could be configured such that the travel within the slot 80 is restricted.

Figure 5:
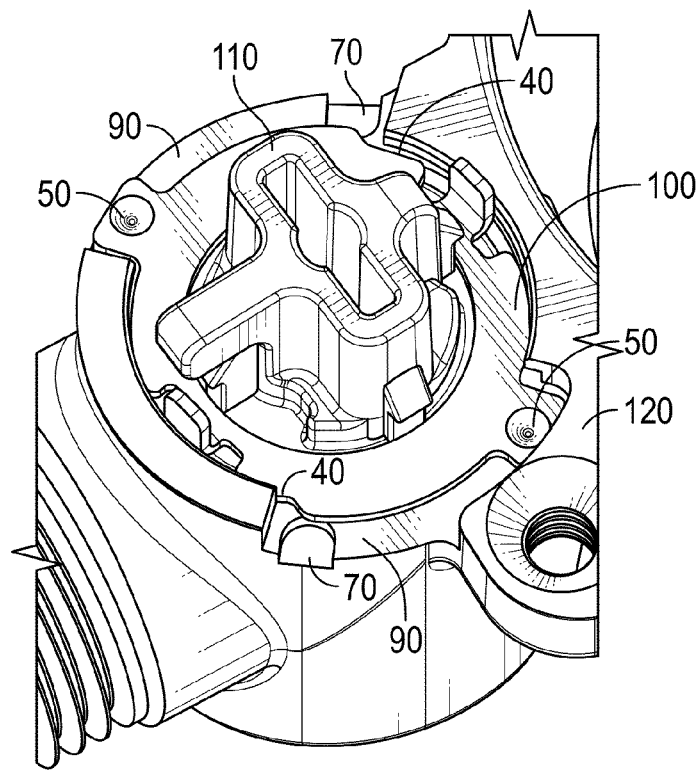
FIG. 5 is a perspective view of a check valve partially installed in a valve body including a retainer, according to an exemplary embodiment.

Referring to FIG. 5, a perspective view of a check valve 110 partially installed in a valve body 120 including a retainer 100, according to an exemplary embodiment, is shown. In FIG. 5, the retainer 100 is shown in an initial position where the first group of projections 40 and the second group of projections 50 are mated with the channel 90. This mating is intended to cause the retainer 100 to deform slightly because the second group of projections 50 is not coplanar with the continuous body 10 of the retainer 100. This deformation is intended to cause the retainer 100 to store potential energy.

Figure 6:
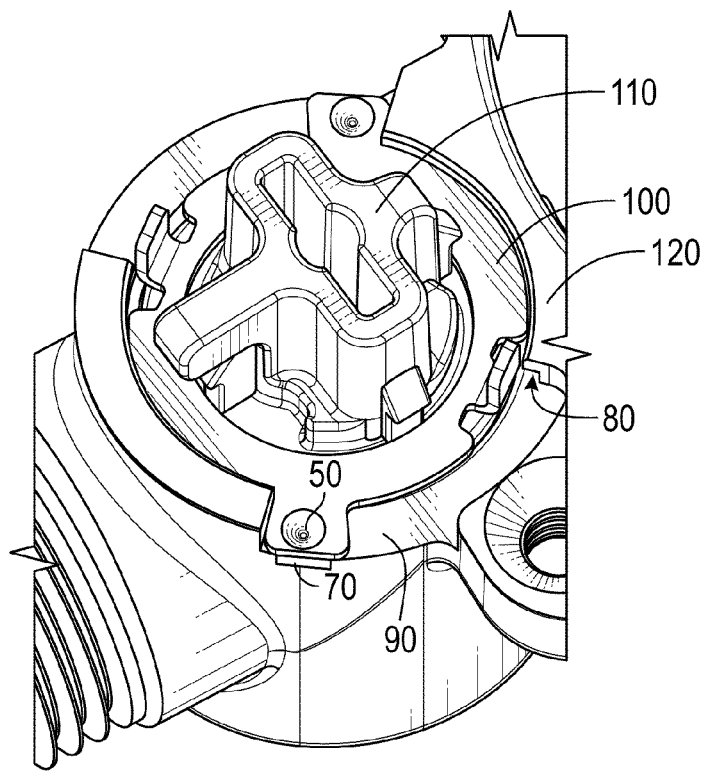
FIG. 6 is a perspective view of a check valve installed in a valve body including a retainer, according to an exemplary embodiment.

Referring to FIG. 6, a perspective view of a check valve 110 installed in a valve body 120 including a retainer 100, according to an exemplary embodiment, is shown. In FIG. 6, the retainer 100 is shown in a locked position. The retainer 100 is rotated within the valve body 120 such that the first group of projections 40 lock by reaching the end of travel within the slot 80, and the second group of projections 50 are displaced within the recesses 70 of the valve body 120. During rotation of the retainer 100 from the initial position to the secured position, the potential energy of the retainer 100 is transformed into kinetic energy and an audible noise is created when the second group of projections 50 seat into the recesses 70. In the secured position, the second group of projections 50, now seated within the recesses 70, and the first group of projections 40, now mated with the end of travel of the slot 80, are intended to prohibit the rotation of the retainer 100 within the channel 90 as well as axial displacement of the retainer 100. Once installed, the retainer 100 may be disconnected from the valve body 120 through the displacement of the tangs 20.

Displacing the tangs 20 in the radial direction of the retainer 100 is intended to cause the second group of projections 50 to be temporarily removed from the recesses 70. In order to finish disconnecting the retainer 100 from the valve body 120, the retainer 100 is rotated in a direction opposite to that of the initial rotation of the retainer 100 and then displaced axially from the valve body 120. For example, the channel 90 may be constructed such that the slot 80 is configured for clockwise rotational locking. In such an example, the initial (locking) rotation of the retainer 100 would be clockwise and the second (unlocking) rotation of the retainer 100 would be counter-clockwise. In other embodiments, it may be desired to have a projection on the valve body 120. In such applications, the same recess-projection mechanism would be used but with the recess 70 being a part of the retainer 100 and the protrusion being a part of the valve body 120. Following this example, the retainer 100 would still contain a second group of projections 50 however the projection would be on the side that was not in direct contact with the channel 90. Rather, the valve body 120 channel 90 would be in contact with a recess 70 that is formed behind the second group of projections 50. If, for instance, the valve body 120 contained a projection, it would be possible to maintain the same securing mechanism by rotating the retainer 100 over the projection on the valve body 120. Further, it would be possible to have a combination of both of the aforementioned securing mechanisms. For instance, a valve body 120 and a retainer 100 could contain both a projection and a recess 70.

Figure 7:
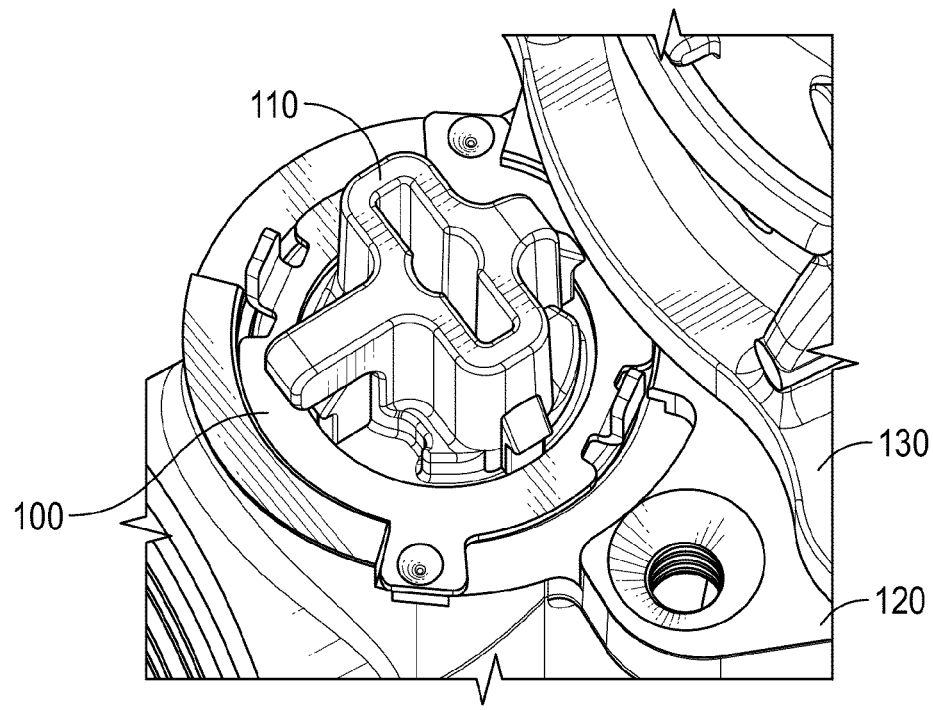
FIG. 7 is a perspective view of a check valve installed in a valve body including a retainer, according to an exemplary embodiment.

Referring to FIG. 7, a perspective view of a check valve 110 installed in a valve body 120 including a retainer 100, according to an exemplary embodiment, is shown. In FIG. 7, the installed retainer 100 within the valve body 120 is shown along with a valve cartridge 130. In application, the valve cartridge 130 is attached to the valve body 120 to cover (e.g., block, seal, obstruct, etc.) the tangs 20 and prevent from unintended removal of the retainer 100. In typical applications, the valve cartridge 130 is installed on the valve body 120 via a threaded bolt and nut connection. However, other suitable connection structure may also be used. In some applications it may be desirable or not necessary to use a valve cartridge 130. In these applications the retainer 100 would still operate and function as intended.

Figure 8:
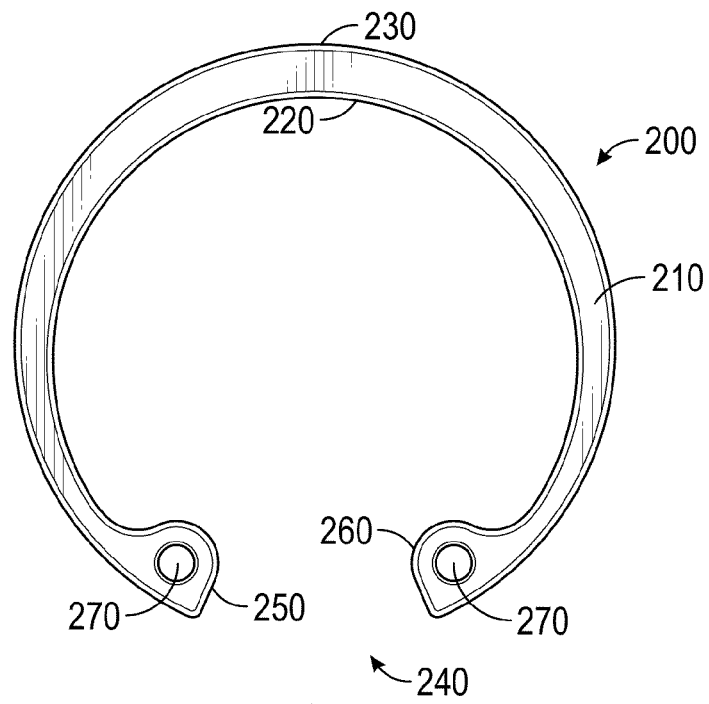
FIG. 8 is front view of a typical internal snap ring element.
Figure 9:
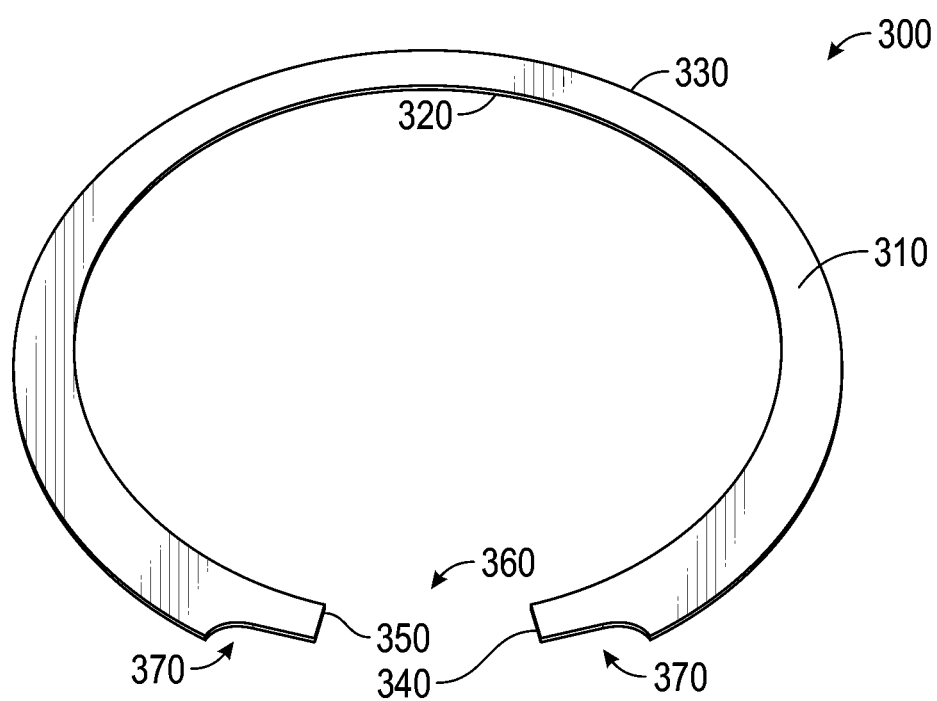
FIG. 9 is a front view of a typical spiral ring element.

Referring to FIGS. 8-9, a front view of a typical internal snap ring and spiral ring element are shown. The spiral ring and snap ring are constructed in a similar fashion. The snap ring 200 and spiral ring 300 include a one-piece ring body 210 and 310 having a first annular surface, or inner ring surface 220 and 320, and a second annular surface, or outer ring surface 230 and 330. The one-piece ring bodies 210 and 310 have a circumferential discontinuity 240 and 340 which is defined by a first ring end 250 and 350 and a second ring end 260 and 360. The first and second ring ends 250 and 350, 260 and 360 each have a generally flat surface oriented along a radial line of the snap rings 200 and spiral rings 300. The one-piece ring bodies 210 and 310 include an inner body diameter (ID) and an outer body diameter (OD). The inner ring surfaces 220 and 320 are disposed along a first circumference of the one-piece ring bodies 210 and 310 at the inner body diameters. Similarly, the outer ring surfaces 230 and 330 are disposed along a second circumference of the one-piece ring body 210 and 310 at the outer body diameter.

The snap rings 200 and spiral rings 300 are in free form—i.e., there are no external forces acting on them. In use, such a snap ring 200 and spiral ring 300 experiences external forces resulting in part from contact with the sidewalls of the cylinder. Therefore, the free form dimensions of the snap rings 200 and spiral rings 300 will differ from their loaded dimensions.

The one-piece ring bodies 210 and 310 shown in FIGS. 8-9 are radially elastic—i.e., they are configured to deform elastically when a radial load is applied. The spiral ring 300 is made from flat spring steel wire, though similar spiral rings may be made from any suitable material. Other materials, for example, stainless steel or polymers such as polypropylene or nylon may also be suitable depending on the particular application. Because the spiral ring 300 is made from a flat spring steel wire, it has a generally uniform rectangular radial cross section.

The snap ring of FIG. 8, requires the use of a special tool to install or remove. The special tool inserts prongs into the snap ring holes 270. The operator then manipulates the tool to force open the snap ring 200 and push the snap ring holes 270 apart. The spiral ring 300 includes indentations 370 which aid in the installation and removal of the spiral ring. In order to install or remove the spiral ring 300, a duck billed pliers must be used to open the spiral ring 300 and push the indentations 370 apart. Accordingly the retainer and system for retaining a check valve in a valve body as shown in FIGS. 1-7 provides a number of advantages over the typical snap ring and spiral ring elements of FIGS. 8 & 9. For example, the present disclosure can be utilized by an operator without the use of any tools. A disadvantage of conventional snap rings 200 and spiral rings 300 is that a special tool needs to be utilized by an operator to install or uninstall the rings. Another of the present disclosure over conventional snap rings 200 and spiral rings 300 is that the present disclosure may utilize a dual-phase securing procedure in application. According to an exemplary embodiment, the present disclosure has a number of second projections (e.g., "dimples") 50 that seat into recesses 70 within the valve body 120 to secure the retainer 100 to the valve body 120. In addition, according to the same exemplary embodiment, the retainer 100 has a number of first projections 40 which seat within slots 80 within the valve body 120 further securing the retainer 100 in the valve body 120.

While the retainer 100 has been described with regard to the incorporation of the check valve 110 and the valve body 120, it is understood that the retainer 100 could be utilized with a variety of valves, plumbing, and hydraulic systems. For example, the retainer 100 may be utilized with valves for shower heads, faucets, spray handles, spas, toilets, hot tubs, tubs, steam generators, pressure washers, sinks, mono-block lavatory faucets, bridge style kitchen faucets, bathfill faucets, and other similar systems and devices.

The retainer 100, the check valve 110, and the valve body 120 may be constructed of various materials such as brass, aluminum, plastic, polymeric material, thermoset, polymeric-based blends, polymer, nylon, rubber, synthetic rubber, polyvinyl chloride, polytetrafluoroethylene, ceramic, ceramic blend, ceramic-metallic blend, alumina, metallic blend, zinc, alloy, brass, aluminum, steel, or any other suitable material such that the retainer 100, the check valve 110, and the valve body 120 may be tailored for a target application.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

While the retainer 100, the check valve 110, and the valve body 120 have been referenced to control a supply of fluid, it is understood that water, air, or other similar fluids could be controlled through the use of the retainer 100, the check valve 110, and the valve body 120.

The construction and arrangement of the elements of the retainer 100 and all other elements and assemblies as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Other substitutions, modifications, changes and omissions may also be made in the design, operating conditions and arrangement of the various exemplary embodiments without departing from the scope of the present invention. For example, any element (e.g., flow restrictor, compact flow restrictor, etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A retainer for retaining a check valve to a valve body, the retainer comprising:
   a continuous body having an upper surface defining a first plane and a lower surface defining a second plane, and configured to engage a slot of the valve body upon rotation of the continuous body relative to the valve body to secure the continuous body to the valve body, wherein the continuous body includes an opening configured to receive a portion of the check valve;
   a first group of projections having an upper surface on the first plane and a lower surface on the second plane, and configured to contact the valve body to limit rotation of the retainer relative to the valve body; and
   a second group of projections extending axially from the continuous body and configured to engage at least one of the check valve and valve body;
   wherein the retainer is configured to be rotatable relative to the check valve.

2. The retainer for retaining a check valve to a valve body of claim 1, wherein the retainer is rotatable relative to the valve body to selectively engage the continuous body with a channel of the valve body.

3. The retainer for retaining a check valve to a valve body of claim 1, wherein the retainer is rotatable relative to the check valve to secure the continuous body to the check valve.

4. The retainer for retaining a check valve to a valve body of claim 1, wherein the continuous body has an annular shape.

5. The retainer for retaining a check valve to a valve body of claim 1, wherein the continuous body is flat.

6. A valve assembly for a plumbing fixture, comprising:
   a valve body configured to be fluidly connected to a plumbing fixture, the valve body defining a cavity and a wall including a channel;
   a check valve disposed in the cavity and configured to selectively stop a flow of fluid through the valve assembly; and
   a retainer that includes:

a continuous body that selectively engages the channel upon a first rotation of the retainer relative to the valve body and the check valve to couple the retainer to the valve body;

a first group of projections configured to contact a stop of the valve body upon a second rotation of the retainer relative to the valve body and the check valve; and a second group of projections extending axially from the continuous body of the retainer and configured to radially deflect and engage at least one of the check valve and the valve body.

7. The valve assembly for a plumbing fixture of claim 6, wherein when the first group of projections contacts the stop, further rotation of the retainer in a direction toward the stop is prohibited by the stop.

8. The valve assembly for a plumbing fixture of claim 6, wherein the second rotation of the retainer occurs over a greater distance than the first rotation of the retainer.

9. The valve assembly for a plumbing fixture of claim 6, wherein the second group of projections engages a recess in the channel of the valve body.

10. The valve assembly for a plumbing fixture of claim 6, wherein the outer edge of the continuous body of the retainer engages a slot of the valve body and an inner edge of the continuous body of the retainer engages a retention protrusion of the check valve.

11. The valve assembly for a plumbing fixture of claim 6, wherein the continuous body has an annular shape.

12. The valve assembly for a plumbing fixture of claim 6, wherein the continuous body is flat.

13. A retainer for retaining a check valve to a valve body for use within a plumbing fixture, the retainer comprising:

a continuous body configured to engage a slot of the valve body upon rotation of the continuous body relative to the valve body to secure the continuous body to the valve body, wherein the continuous body includes an opening configured to receive a portion of the check valve;

a first group of projections configured to contact the valve body to limit rotation of the retainer relative to the valve body;

a second group of projections extending axially from the continuous body and configured to engage at least one of the check valve and valve body; and a group of tangs extending axially from the continuous body and configured to exert a force on the second group of projections upon radial displacement of the group of tangs;

wherein the retainer is configured to be rotatable relative to the check valve.

14. The retainer for retaining a check valve to a valve body of claim 13, wherein the retainer is rotatable relative to the valve body to selectively engage the continuous body with a channel in the valve body.

15. The retainer for retaining a check valve to a valve body of claim 13, wherein the retainer is rotatable relative to the check valve to secure the continuous body to the check valve.

16. The retainer for retaining a check valve to a valve body of claim 13, wherein the continuous body has an annular shape.

17. The retainer for retaining a check valve to a valve body of claim 13, wherein the continuous body is flat.

18. The retainer for retaining a check valve to a valve body of claim 13, wherein when the first group of projections contacts a stop of the valve body, further rotation of the retainer in a direction toward the stop is prohibited by the stop.

19. The retainer for retaining a check valve to a valve body of claim 13, wherein the continuous body engages a channel in the valve body upon a first rotation of the retainer relative to the valve body;

wherein the first group of projections are configured to contact the stop of the valve body upon a second rotation of the retainer relative to the valve body; and wherein the second rotation of the retainer occurs over a greater distance than the first rotation of the retainer.

20. The retainer for retaining a check valve to a valve body of claim 13, wherein the second group of projections engages a recess in a channel in the valve body.

* * * * *